United States Patent

[11] 3,620,716

[72] Inventor Paul D. Hess
 Lower Burrell, Pa.
[21] Appl. No. 828,338
[22] Filed May 27, 1969
[45] Patented Nov. 16, 1971
[73] Assignee Aluminum Company of America
 Pittsburgh, Pa.

[54] MAGNESIUM REMOVAL FROM ALUMINUM ALLOY SCRAP
 3 Claims, No Drawings

[52] U.S. Cl. .................................................. 75/68,
 75/63, 75/93, 75/94
[51] Int. Cl. ........ ........................................... C22b 21/06
[50] Field of Search ........................................ 75/68, 93,
 94, 63

[56] References Cited
UNITED STATES PATENTS

| | | | | |
|---|---|---|---|---|
| 2,184,705 | 12/1939 | Willmore | ............ | 75/93 AC |
| 2,195,217 | 3/1940 | Lindenberger et al | ..... | 75/68 |
| 2,848,321 | 8/1958 | Bunbury et al | ........ | 75/68 X |

Primary Examiner—L. Dewayne Rutledge
Assistant Examiner—J. Davis
Attorney—Carl R. Lippert ABSTRACT: Magnesium can be removed from secondary aluminum by contacting the melted metal with an effective amount of a flux containing potassium aluminum fluoride. This flux offers cost advantages over the known aluminum fluoride flux.

MAGNESIUM REMOVAL FROM ALUMINUM ALLOY SCRAP

BACKGROUND OF THE INVENTION

One source of aluminum occurs as scrap, e.g. cuttings removed from various aluminum articles. Sometimes this scrap contains significant amounts of magnesium and it is often desired that some or substantially all this magnesium be removed prior to reemploying the metal. Treatment with a flux containing mainly aluminum fluoride, $AlF_3$, is one of the known methods of removing magnesium and is considered quite effective for that purpose in the art. However, aluminum fluoride is relatively expensive and it would be highly advantageous to be able to utilize a different and less expensive flux material if it could achieve results comparing favorably with those associated with $AlF_3$.

STATEMENT OF THE INVENTION

In accordance with the invention, magnesium can be removed from secondary aluminum alloys by treating such with a flux containing potassium aluminum fluoride. This flux material has a significant cost advantage over aluminum fluoride, the savings being in the neighborhood of about 50 percent. In addition to the cost advantage, potassium aluminum fluoride offers further advantages in decreased melt loss and greatly decreased fume generation during fluxing.

generally up to 10 hours, although shorter soak times of 2 to 4½ hours are often adequate. In addition, periodic restirring of the flux and melt during the soak period may be utilized to advantage as explained in more detail in the examples discussed below. During the soak period, the flux reacts with the magnesium and the reaction product floats to the top of the melt and enters the skim layer floating on the melt surface.

To demonstrate the advantages of practicing the invention, the examples set forth in table I proceed. The examples compare $AlF_3$ with the improved flux which is simply designated KAlF without subscripts since, as stated above, it contains both $K_3AlF_6$ and $KAlF_4$. The table sets out for each example the weight of the melt in pounds, the flux employed, the weight of the flux in pounds, the soaking time in hours, the magnesium content in weight percent before and after the treatment, the cost of the flux consumed in terms of dollars per pound of magnesium removed and the total melt loss associated with the Mg removal treatment in terms of a weight percentage of the initial melt. In examples 1 to 6, the melts were of rather small size weighing approximately 50 pounds and were formed in crucibles of relatively modest size. In these examples, the scrap metal was melted and brought to a temperature between 1,500° and 1,600° F. The flux was then applied to the melt surface and worked into the metal by manual stirring after which the melt was allowed to soak for a period of time.

TABLE I

| Ex. | Melt wt., lb. | Flux | Flux wt., lb. | Soak, hours | Mg content, percent Before | After | Flux cost | Melt loss, percent |
|---|---|---|---|---|---|---|---|---|
| 1 | 51 | $AlF_3$ | 2.34 | 2 | 4.1 | 3.0 | 0.50 | 10.8 |
| 2 | 50 | KAlF | 2.25 | 2 | 4.1 | 3.0 | 0.35 | 7.2 |
| 3 | 49.5 | $AlF_3$ | 2.06 | 3¾ | 0.55 | 0.33 | 2.26 | 7.3 |
| 4 | 49.5 | KAlF | 2.06 | 3¾ | 0.54 | 0.05 | 0.76 | 0.8 |
| 5 | 50 | $AlF_3$ | 1.80 | 3¾ | 0.55 | 0.09 | 1.00 | 3.2 |
| 6 | 49 | KAlF | 1.76 | 3¾ | 0.52 | 0.01 | 0.61 | 3.3 |
| 7 | 548 | $AlF_3$ | 20 | 3½ | 0.62 | 0.36 | 1.62 | 6.6 |
| 8 | 498 | KAlF | 16 | 3½ | 0.65 | 0.32 | 0.83 | 1.8 |
| 9 | 545 | KAlF | 20 | 3½ | 0.64 | 0.20 | 0.71 | 2.5 |
| 10 | 518 | $AlF_3$ | 19 | 3½ | 0.59 | 0.06 | 0.81 | 9.3 |
| 11 | 544 | KAlF | 20 | 3⅔ | 0.63 | 0.09 | 0.58 | 6.0 |
| 12 | 516 | KAlF | 19 | 3½ | 0.62 | 0.06 | 0.55 | 6.3 |

DESCRIPTION

One economic source of potassium aluminum fluoride has developed as a byproduct from the manufacture of rich aluminum alloys containing substantial amounts of titanium or boron or both. This potassium aluminum fluoride is a mixture of $KAlF_4$ and $K_3AlF_6$. The melting temperature of the potassium aluminum fluoride is less than that of aluminum which may offer an advantage over aluminum fluoride, which has a melting temperature greater than that of aluminum, where lower temperatures are desired. The particle size of the flux is not especially critical, −30 mesh (Tyler Sieve Series) being quite appropriate. While the invention contemplates the use of a flux substantially all of which is composed of potassium aluminum fluoride, obviously the flux may contain some amount of other ingredients, for instance aluminum fluoride which is known to be effective for the purpose of interest here. Accordingly, the invention contemplates that the flux contain a significant amount, generally at least 25 percent, and preferably at least 50 percent, of potassium aluminum fluoride. The flux may be applied to the melted scrap in a number of ways. For instance, it may be applied to the surface of a melt containing the scrap and then stirred into the melt. Where the flux is applied to the melt surface, better results are usually obtained when the molten metal and flux are well stirred at intervals not greater than a half hour apart during the soaking period. The amount of flux employed varies depending on the amount of magnesium present and the amount desired to be removed. Generally, the flux varies from less than 1 to more than 8 pounds of flux per pound of magnesium in the scrap material where the flux is substantially all potassium aluminum fluoride. After the flux is applied and stirred into the melt, the melt is allowed to soak for a period of Examples 7 through 11 demonstrate the result of treatments for open-hearth melts of substantial size, approximately 10 times the size of the melts in the previous examples. The melt temperature in examples 7 and 8 was 1,550° and the treatment was conducted in the same general manner as with the preceding examples. In example 9, the melt temperature was lowered to 1,350° F. and the procedure otherwise was in accordance with the previous examples. In examples 10 and 11, the initial melt temperature was 1,350° F. and the flux and metal were stirred well into one another at intervals not greater than a half hour. In example 12, the initial melt temperature was 1,550° F. and the melt was stirred periodically as in examples 10 and 11.

In viewing table I, it becomes immediately apparent that, other things being substantially equivalent, changing the flux from aluminum fluoride to potassium aluminum fluoride results in a significant flux cost decrease. An additional advantage realized is that the melt loss caused by the magnesium removal treatment is also usually less when using the potassium aluminum fluoride flux. A still further advantage is realized in that, in examples 3, 5, 7 and 10, the use of aluminum fluoride flux resulted in very heavy fuming when the flux was stirred into the melt. In contrast, every example employing potassium aluminum fluoride involved a relatively small amount of fuming which provides for improved safety in melt treating.

One preferred embodiment of the invention relates to treating aluminum melts containing from about 0.4 to about 1.2 percent magnesium with potassium aluminum fluoride flux at a temperature of at least 1,400° F. The amount of flux employed in this embodiment varies from 5 to 6.5 pounds of flux per pound of magnesium in the scrap melted to form the aluminum alloy melt. The soaking time is about 3 to 4½ hours and the flux and melt are repeatedly stirred at intervals not exceeding a half hour.

What is claimed is:

1. A method of treating a molten body of aluminum which contains magnesium so as to decrease the amount of magnesium in said body, comprising the steps:
   1. applying to said molten body of aluminum a flux containing as an active flux ingredient potassium aluminum fluoride,
   2. maintaining said flux in contact with said molten body for a period of time of up to 10 hours to cause at least a substantial portion of the magnesium in said molten body to be removed from said molten body by reaction with said flux so that a magnesium-containing reaction product floats on the surface of said molten body in a skim layer, and
   3. thereafter separating said skim layer from said molten body.

2. The method according to claim 1 wherein said flux contains at least 25 percent potassium aluminum fluoride.

3. The method according to claim 1 wherein:
   1. said molten body of aluminum contains from 0.4 to 1.2 percent magnesium,
   2. said flux contains at least 50 percent potassium aluminum fluoride,
   3. said molten body of aluminum is at a temperature of at least 1,400° F. when said flux is applied thereto,
   4. said flux is applied in an amount of from 5 to 6½ pounds flux per pound of magnesium in said melt, and
   5. said flux is maintained in contact with said molten body for a period of from 3 to 6 hours while said molten body and said flux are stirred together periodically at intervals not exceeding a half hour.

* * * * *